United States Patent
Nakajima

(10) Patent No.: US 7,894,707 B2
(45) Date of Patent: Feb. 22, 2011

(54) RECORDING APPARATUS

(75) Inventor: Hirofumi Nakajima, Kanagawa (JP)

(73) Assignee: Canon Kabushiki Kaisha (JP)

( * ) Notice: Subject to any disclaimer, the term of this patent is extended or adjusted under 35 U.S.C. 154(b) by 2006 days.

(21) Appl. No.: 10/875,595

(22) Filed: Jun. 24, 2004

(65) Prior Publication Data
US 2004/0264935 A1    Dec. 30, 2004

(30) Foreign Application Priority Data

Jun. 24, 2003 (JP) ............................. 2003-179952
May 31, 2004 (JP) ............................. 2004-161585

(51) Int. Cl.
*H04N 5/77* (2006.01)

(52) U.S. Cl. ............... 386/224; 348/207.99; 348/222.1; 348/714; 386/222

(58) Field of Classification Search ............... 386/46, 386/83, 95, 107, 117, 124–126, 129, 200, 386/210, 222, 224; 348/74, 207.99, 207.1, 348/222.1, 553, 571, 714
See application file for complete search history.

(56) References Cited

FOREIGN PATENT DOCUMENTS

| JP | 2001-128105 A | 5/2001 |
|---|---|---|
| JP | 2001128105 | * 5/2001 |
| JP | 2001-231001 A | 8/2001 |
| JP | 2002-300444 A | 10/2002 |

OTHER PUBLICATIONS

Office action issued in corresponding Japanese patent application No. 2004-161585 dated Feb. 3, 2009. Partial translation provided.

* cited by examiner

*Primary Examiner*—Thai Tran
*Assistant Examiner*—Mishawn Dunn
(74) *Attorney, Agent, or Firm*—Rossi, Kimms & McDowell LLP

(57) ABSTRACT

A recording apparatus of the present invention, in accordance with a data write speed of an external storage device, switches a writing mode between a first mode in which the apparatus suspends reading out moving image data from a memory until a predetermined amount of moving image data relating to a storage capacity of the memory is stored in the memory, and starts reading the moving image data from the memory to write it into the external storage device, after the predetermined amount of moving image data is stored completely, and a second mode in which the apparatus starts reading the moving image data from the memory to write it into the external storage device, without waiting for the storage of the predetermined amount of the moving image data into the memory.

31 Claims, 8 Drawing Sheets

RECORDING APPARATUS

BACKGROUND OF THE INVENTION

1. Field of the Invention

The present invention relates to a recording apparatus, and more particularly to an apparatus for recording image signals on recording media having different write speeds.

2. Description of the Related Art

A known conventional digital camera photographs an image and records it in a memory card as digital data.

Various digital cameras of this type have been proposed recently which can record not only still images but also moving images for a predetermined period, which are disclosed, for example, in Japanese Patent Application Laid-Open No. 2002-300444.

If moving images are taken with a digital camera and recorded in a memory card as digital data, it is necessary to record data of a plurality of consecutive frames. However, a write speed of memory card is often slower than a data rate of moving image data. Conventionally, picked-up image data therefore is encoded and thereafter stored in a large capacity buffer memory, and then the image data is written from the buffer memory to a memory card at a lower rate.

Also when the moving image data recorded in the memory card is reproduced, all the files of the moving image data are read out from the memory card and stored into the buffer memory, and thereafter a reproduction process is executed.

As described above, with a conventional digital camera, moving image data is once stored in a buffer memory and then written into a memory card. Therefore, the length of recordable moving image data is determined by the storage-capacity of the buffer memory. It is therefore necessary to provide a large capacity buffer memory in order to take moving image data for a long period of time, or to reduce a data amount by increasing a compression factor when moving image data is encoded.

However, use of a large capacity memory results in a rising cost, and increasing the compression factor leads to a lowered image quality.

Further, since the reproduction process starts after one moving image data file is completely stored in a buffer memory, a user is required to wait for some time until a reproduced image is acquired.

SUMMARY OF THE INVENTION

It is an object of the present invention to solve these problems.

Another object of the present invention is to realize comfortable moving image photographing matching a write speed of a recording medium.

Still another object of the present invention is to realize a comfortable moving image reproduction function matching a read speed of a recording medium.

In order to achieve these objects, according to an embodiment of the present invention, a recording apparatus of the present invention includes: producing means for producing moving image data; writing means including a memory for storing the moving image data, for writing the moving image data in an external storage device; speed detecting means for detecting a data write speed of the external storage device; control means for controlling an operation of the writing means, wherein in accordance with the data write speed detected by the speed detecting means, the control means switches a writing mode between (i) a first mode in which the control means suspends reading out the moving image data from the memory until a predetermined amount of the moving image data related to a storage capacity of the memory, and starts reading the moving image data from the memory to write the read moving image data into the external storage device, after storage of the predetermined amount of the moving image data into the memory is completed, and (ii) a second mode in which the control means starts reading the moving image data from the memory without waiting for storage of the predetermined amount of the moving image data into the memory to write the read moving image data into the external storage device.

Other objects and features of the present invention will become apparent from the detailed description of embodiments when read in conjunction with the accompanying drawings.

DETAILED DESCRIPTION OF THE PREFERRED EMBODIMENTS

Embodiments of the present invention will now be described.

Figure 1:
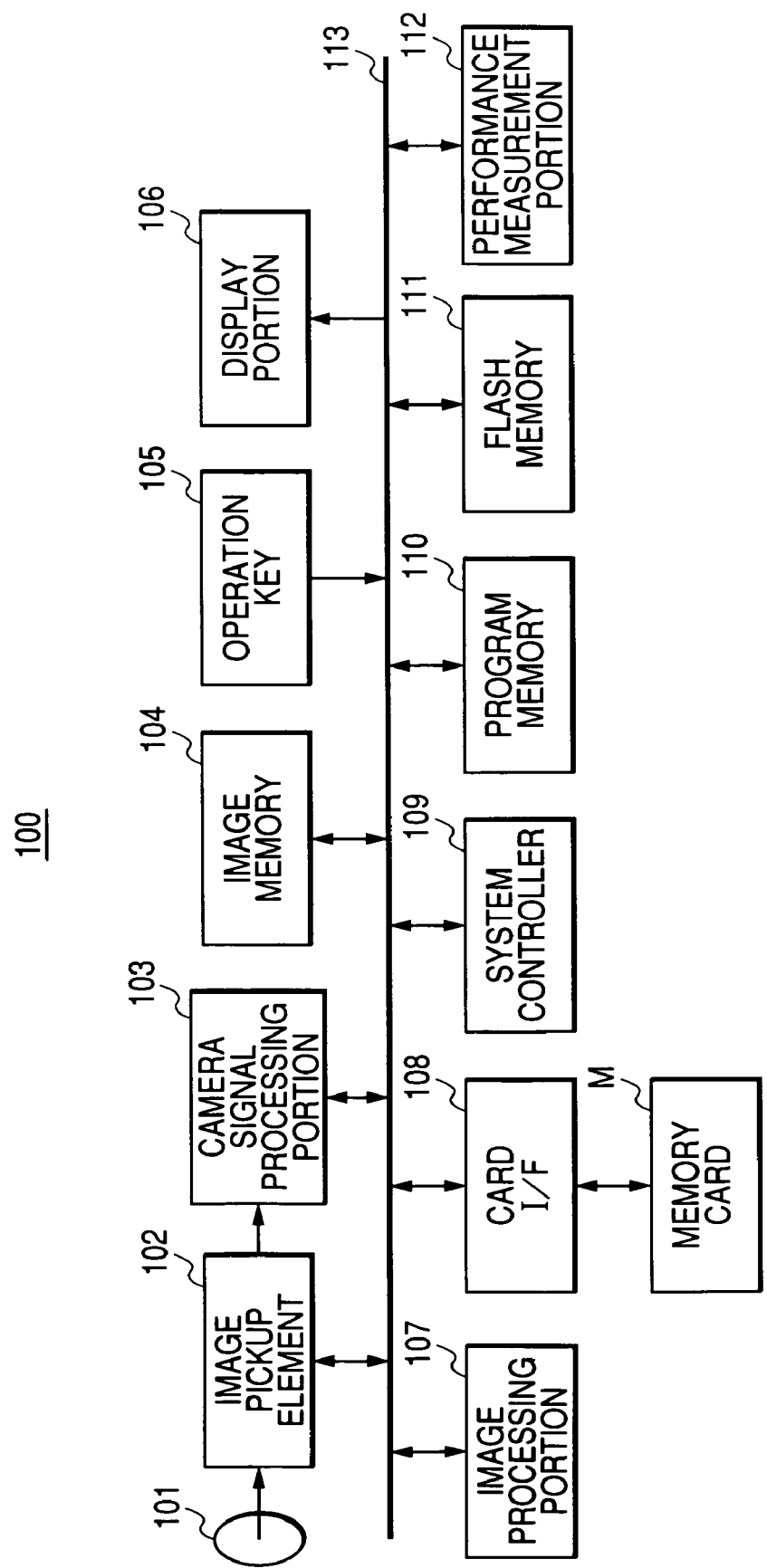
FIG. 1 is a diagram showing the structure of a digital camera to which the present invention is applied.

FIG. 1 is a diagram showing the structure of a digital camera applied to which is the present invention.

Referring to FIG. 1, a lens 101 receives light from an object, an image pickup element 102 focuses light passed through the lens 101, and a camera signal processing portion 103 performs signal processing of on an image signal from the image pickup element 102 to generate a standard image signal. An image memory 104 temporarily stores image data, an operation key 105 is a user interface, a display 106 displays an image, an image processing portion 107 makes an image signal to be subjected to an encoding/decoding process, and an interface 108 is used for recording and reproducing various data into and from a memory card M. A system controller 109 controls the entirety of the digital camera, a program memory 110 stores an operation program of the controller 109, and a flash memory 111 stores compressed programs. A recording medium performance measurement portion 112 measures a data write speed and a data read speed of the loaded memory card M, and reference numeral 113 denotes a data bus.

When the digital camera is powered on, the compressed program in the program flash memory 111 is decompressed/developed into the program memory 110, and CPU 109 operates in accordance with the program stored in the program memory 110.

First, when the memory card M is connected to the digital camera, the recording medium performance measurement portion 112 writes a predetermined amount of data into the recording medium via the interface 108 to measure the time period from the write start to end. Similarly, a predetermined amount of written data is read via the interface 108 to measure the time period from the read start to end.

In such a measurement operation, the measurement portion 112 derives a data write speed ws (data rate) [bps] of the loaded memory card M from the time taken to write the predetermined amount of data, and also derives a data read speed rs (data rate) [bps] of the loaded memory card M from the time taken to read the predetermined amount of data.

In this embodiment, although the recording medium performance measurement portion 112 is provided as a separate component, its operation may be realized by making CPU of the system controller control the interface 108 to read and write data.

In this embodiment, the recording and reproducing process for moving image data is changed in accordance with the write speed ws and read speed rs of the memory card M measured in the above way.

Also in this embodiment, when a recording medium is connected the image recording/reproducing apparatus, the recording medium performance measurement means measures the performance of the removable recording medium. This measurement may be performed when the operation switch 105 sends a moving image record command or moving image reproduction command to the system controller 109.

Next, description will be made on a recording process to be executed by the digital camera shown in FIG. 1.

First, a still image taking operation will be described.

When a still image photographing instruction is issued from the operation switch 105, the system controller 109 stores one frame image signal obtained from the image pickup element 102 once in the image memory 104, and the camera signal processing portion 103 processes the image signal to store it back into the image memory 104. Thereafter, this image signal is subjected to a predetermined encoding process by the image processing portion 107 to write it back into the image memory 104. The system controller 109 reads out the encoded image data written in the image memory 104 and outputs it to the interface 108. The interface 108 records this one frame encoded image data in the memory card M as a still image data file.

Next, a moving image taking process will be described.

When a moving image photographing start instruction is issued from the operation switch 105, the system controller 109 stores in the image memory 104, image data constituted of a number of consecutive frames obtained from the image pickup element 102, and then reads out the image data in the unit of frame and outputs it to the camera signal processing portion 103. After this image data is processed by the camera signal processing portion 103, it is written back into the image memory 104. Next, the moving image data is read out from the image memory 104 and encoded by the image processing portion 107 by a known method to be written in the image memory 104.

In this embodiment, the picture size (pixel number) per one frame of moving image data to be recorded, a frame rate, and a compression factor (data rate) can be optionally set by a user by manipulating the operation key 105.

The system controller 109 controls the camera signal processing portion 102 in such a manner that the moving image data corresponding to the picture size and frame rate designated by the operation key 105 is output, and also controls the image processing portion 107 in such a manner that the moving image data is encoded in accordance with the set data rate and picture size of the moving image data. The image processing portion 107 encodes the moving image data to have the set data rate, in accordance with an instruction from the system controller 109.

Specifically, for example, when the image processing portion 107 encodes moving image data by the MotionJPEG method combining DCT, quantization and variable length coding, the quantization step size is changed adaptively so as to obtain the set data rate.

In some nowaday digital cameras and the like, the data rate is not changed by changing the quantization step, but several recording modes are prepared having different combinations of the number of pixels per frame and the frame rate of moving image data, and a user selects one of these recording modes.

In this case, the data rate of moving image data is determined from the picture size and frame rate by the camera signal processing portion 102.

The process after the moving image data encoded in this manner is stored in the image memory 104 varies with a write speed of the memory card M described above.

Figure 2A:
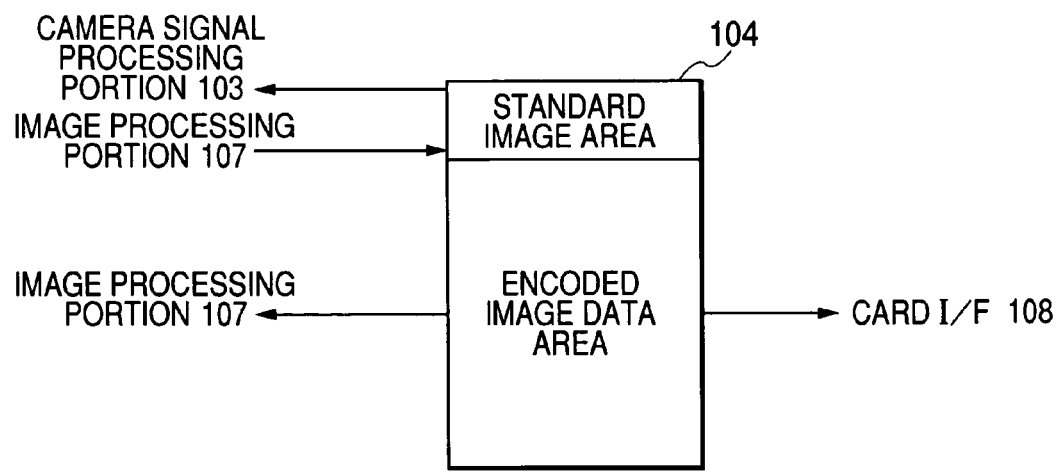
FIGS. 2A and 2B are diagrams illustrating a recording operation according to an embodiment of the present invention.
Figure 2B:
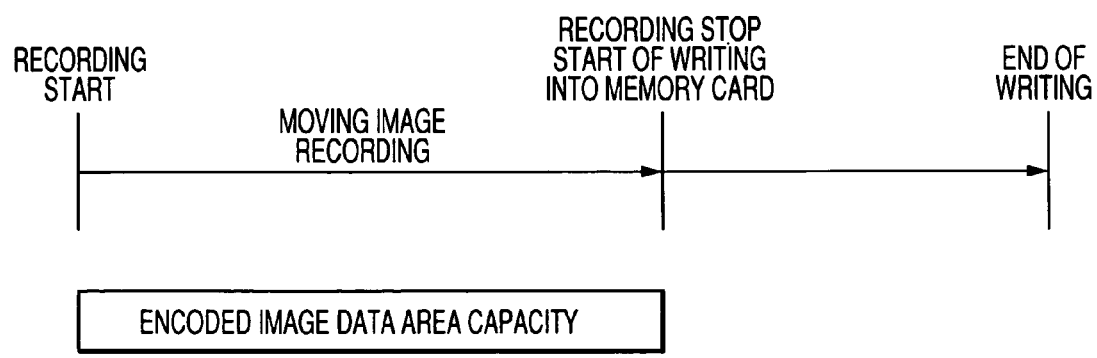

With reference to FIGS. 2A and 2B, description will be made on a process of writing moving image data into the memory card M.

The system controller 109 compares the write speed ws of the memory card M with the data rate of moving image data to thereby judge whether or not the encoded moving image data can be written in real time. If the write speed ws is slower than the set data rate of the moving image data, the encoding image data is once stored in the image memory 104 and after data storage into the image memory 104 is stopped (after the image memory 104 becomes full), writing into the memory card M starts, similar to a conventional process.

FIG. 2A illustrates the structure of the image memory 104 when the write speed of the memory card M is slow, and FIG. 2B illustrates an operation image.

Specifically, moving image data obtained by the image pickup element 102 is written into a standard image area shown in FIG. 2A, and after being encoded, it is written in an encoded image data area.

Moving image data pickup and storage are performed until the capacity of the encoded image data area of the image memory 104 becomes full. Alternatively, the recording operation may be terminated before the capacity of the encoded image data area becomes full, by manipulating the operation switch 105.

After the encoded moving image data is stored until the capacity of the encoded image data area of the image memory 104 becomes full, the system controller 109 stops pickup of moving images and writing the encoded moving image data into the image memory 104, and then outputs the encoded moving image data stored in the image memory 104 to the interface 108. The interface 108 writes this series of encoded moving image data into the memory card M as one file. In this case, the system controller 109 controls the card I/F 108 in such a manner that the moving image data is recorded together with the information of the data rate as additional information of the file.

In this case, the record time period of moving image data until the image memory 104 becomes full varies with the data rate of the moving image data.

As above, if the memory card M does not have a data transfer rate necessary for recording moving image data, the recordable time period is determined by the capacity of the encoded data area of the image memory 104. Therefore, even if there is an empty space of the memory card M, moving image data cannot be recorded for a time period exceeding a time period determined by the capacity of the encoded data area of the image memory 104.

Next, description will be made on a process to be performed when the write speed of the memory card M is faster than a predetermined threshold value at which encoded moving image data can be written in real time.

Figure 3A:
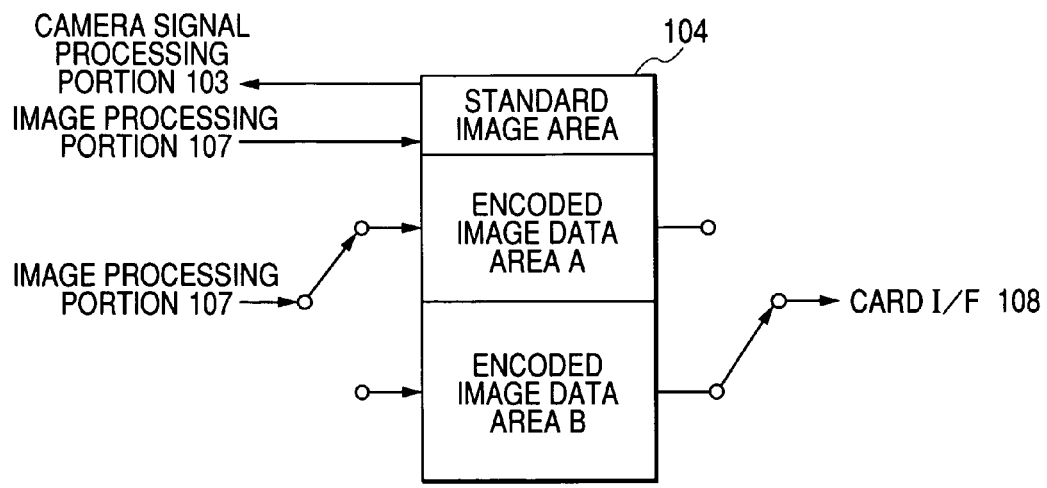
FIGS. 3A and 3B are diagrams illustrating a recording operation according to an embodiment of the present invention.
Figure 3B:
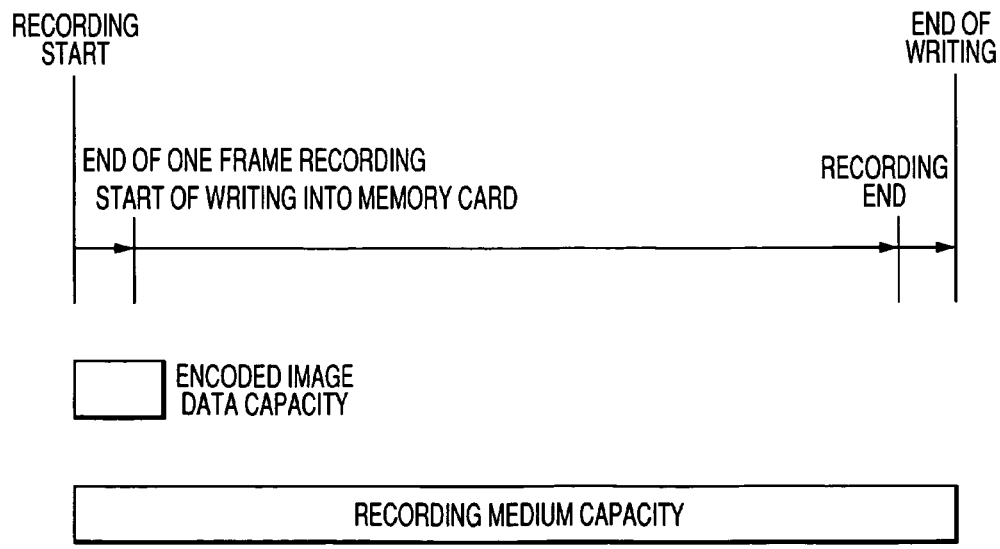

FIG. 3A shows the state of the image memory 104 when the write speed of the memory card M is fast, and FIG. 3B shows an operation image.

In this case, as shown in FIG. 3A, the system controller 109 divides the encoded image data area of the image memory 104 into two areas A and B to selectively use the areas as a write area and read area alternatively for each frame of encoded image data.

Specifically, the image processing portion 107 reads the image data of one frame from the standard image area of the image 104 and encodes it to temporarily store it in the encoded image data area A of the image memory 104. In this case, the system controller 109 reads out the encoded image data one frame before from the encoded image area B of the image memory 104 and outputs it to the interface 108.

For the next frame, conversely the encoded image data is written in the encoded data area B of the image memory 104, and at the same time the encoded image data is read out from the encoded image data area A of the image memory 104.

As above, if the write data rate of the memory card M is faster than the data rate of moving image data and the moving image data can be written in the memory card M in real time, moving image data can be recorded during the time period corresponding to the memory capacity of the memory card M, independently from the capacity of the image memory 104.

FIG. 3B is a diagram illustrating the above-described moving image recording process. As shown in FIG. 3B, a write operation relative to the recording medium starts immediately after data of one frame is stored in the encoded image area of the image memory 104 after the record start.

According to the embodiment, when moving image data is to be written in the memory card M and if the write speed of the loaded memory card M is faster than the data rate of moving image data, a write operation to the memory card M starts immediately after encoded image data of one frame is stored in the image memory, without waiting for the completion of storage of encoded image data into the image memory 104, as shown in FIG. 3B. It is therefore possible to photograph images and record the moving image data for a long time independently from the capacity of the image memory 104.

Even in the case that data cannot be recorded in real time at the presently-set data rate of moving image data depending upon the record rate of the memory card M, moving image data can be recorded in real time if a user sets a lower data rate of moving image data.

Therefore, for example, the system controller 109 detects a data rate of moving image data recordable in real time in accordance with the record rate of the memory card M detected by the performance measurement portion 112, and displays this detection result information on the display 106. In this manner a user can be notified the data rate of moving image data recordable in real time.

Next, a reproducing operation will be described.

First, a still image data reproducing operation will be described.

Upon reception of a still image file reproduction instruction from the operation switch 105, the system controller 109 controls the interface 108 to read out data of the designated still image file from the memory card M and write it in the image memory 104. Next, the system controller 109 reads out the still image data written in the image memory 104 and outputs it to the image processing portion 107 which in turn decodes the still image data and writes it back into the image memory 104. This decoded still image data is read out from the image memory 104 and displayed on the display 106.

Next, a moving image data reproducing process will be described.

Upon reception of a moving image data reproduction instruction from the operation switch 105, the system controller 109 first controls the card I/F 108 to make it reproduce additional information representative of the data rate of moving image data from the designated moving image file. Next, the system controller 109 compares the data read speed rs of the memory card M with the data rate of moving image data to be reproduced, and judges whether or not the moving image data can be read out in real time. If the read speed rs is slower than the data rate of moving image data, all the data in one moving image file are read out from the memory card M and stored in the image memory 104 to start a decoding process, similar to a process of a conventional method.

Figure 4A:
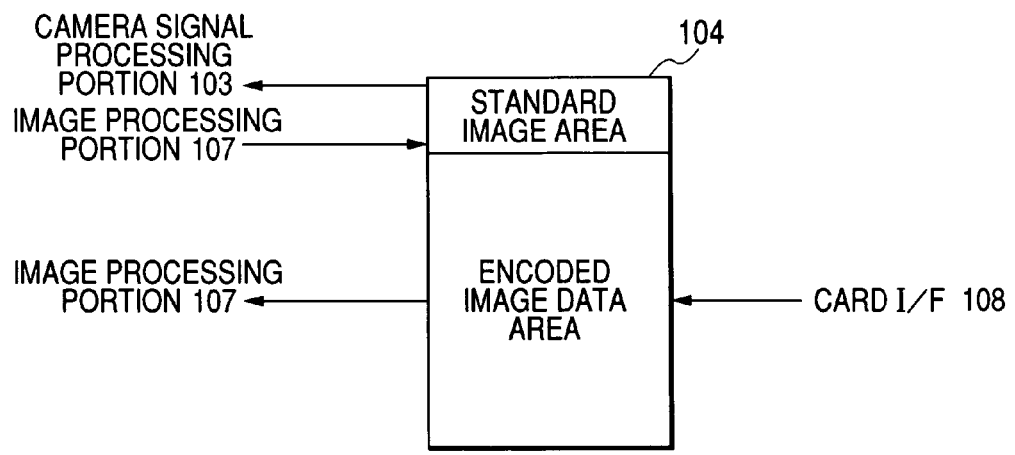
FIGS. 4A and 4B are diagrams illustrating a reproducing operation according to an embodiment of the present invention.
Figure 4B:
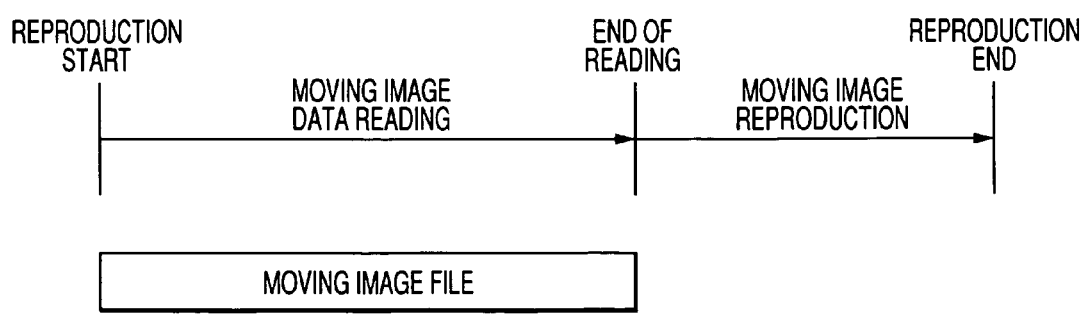

FIG. 4A is a diagram illustrating the state of the image memory 104 when the data read speed of the memory card M is slow, and FIG. 4B is a diagram showing an operation image.

Specifically, the system controller 109 reads out the entirety of the designated moving image data file from the memory card M, and temporarily stores it in the encoded data area of the image memory 104.

After storage of the whole moving image data into the image memory 104 is completed, the system controller 109 sequentially reads out the encoded moving image data from the image memory 104 and outputs it to the image processing portion 107, whereas the image processing portion 107 decodes the encoded image data and writes it in the standard image area of the image memory 104. The system controller 109 thereafter reads out the recorded moving image data from the image memory 104 and displays it on the display 106.

As above, if the data read speed of the memory card M is slower than the data rate of moving image data, all the data in the moving image file is once read and stored in the image memory to start the recording process. A user is therefore required to wait for some time until the reproduced moving image is actually displayed after the reproduction start is instructed.

Next, description will be made on a process to be executed when the data read speed of the memory card M is faster than the data rate of moving image data to be reproduced.

Figure 5A:
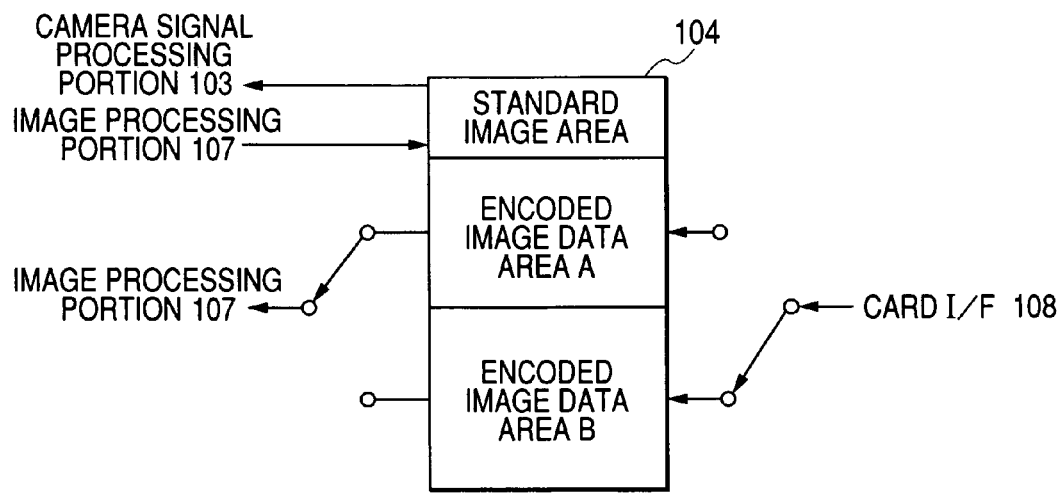
FIGS. 5A and 5B are diagrams illustrating a reproducing operation according to an embodiment of the present invention.
Figure 5B:
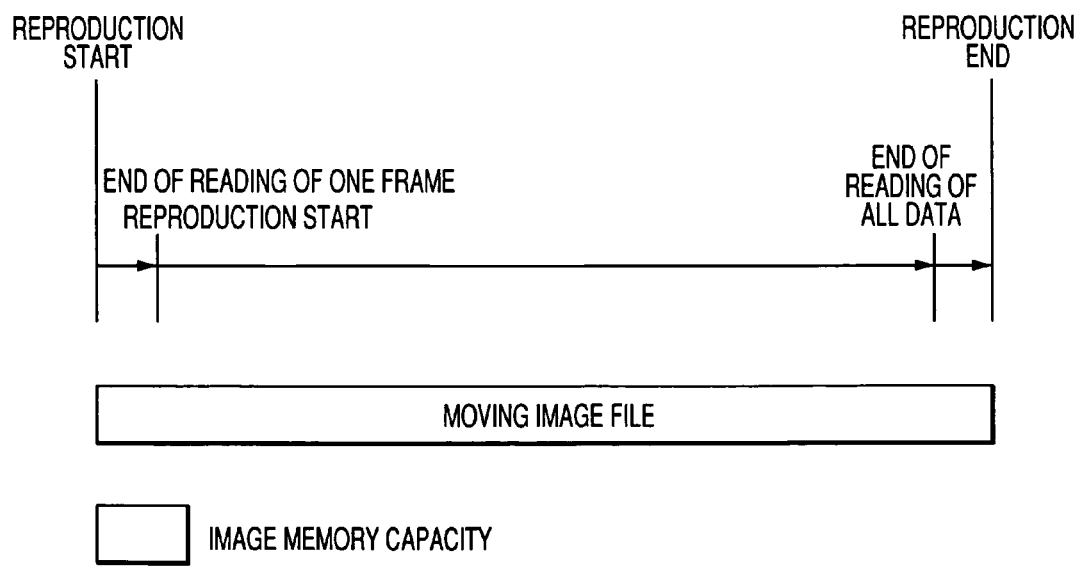

FIG. 5A shows the state of the image memory 104 when the write speed of the memory card M is fast, and FIG. 5B illustrates an operation image.

In this case, the system controller 109 divides the encoded image data area of the image memory 104 into two areas A and B and selectively uses the areas as a write area and a read area alternatively for each frame, as shown in FIG. 5A.

Specifically, the system controller 109 controls the interface 108 to read out moving image data of one frame from the memory card M and temporarily store it in the encoded data area B of the image memory 104. In this case, the system controller 109 reads out the encoded image data of one frame temporarily stored in the encoded data area A of the image memory 104 and outputs it to the image processing portion

107. The image processing portion 107 decodes the moving image data of one frame and writes it in the standard image area of the image memory 104.

For the next frame, conversely the image data of one frame reproduced from the memory card M is written in the encoded data area A, and the encoded image data is read out from the encoded data area B and output to the image processing portion 107.

The system controller 109 sequentially reads the moving image data decoded and written in the image memory 104 in the above manner and displays it on the display 106.

As above, if the data read rate of memory card M is faster than the data rate of moving image data and the moving image data can be read out in real time, the moving image reproduction can be started without waiting for the storage of all the data in one moving image file into the image memory 104.

FIG. 5B is a diagram illustrating the above-described reproduction. As shown in FIG. 5B, reproduction can be started at the time when the first frame of the moving image file is completely read out.

According to the embodiment, when moving image data is to be reproduced and if the write speed of the loaded memory card M is fast, the recording process starts immediately after encoded image data of one frame is stored in the image memory, without waiting for the completion of storage of all moving image file data into the image memory 104, as shown in FIG. 5B. It is therefore possible to display a reproduced moving image immediately after a reproduction start instruction.

Next, a second embodiment will be described.

In this embodiment, description will be made on moving image data reproduction when a data read speed of the memory card M is slower than the data rate of moving image data. Other processes are similar to those of the above-described embodiment.

Figure 6A:
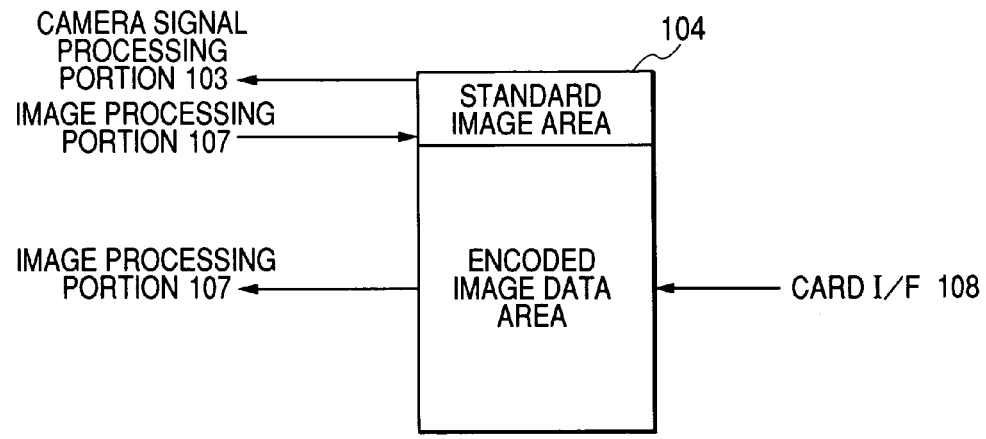
FIGS. 6A and 6B are diagrams illustrating a reproducing operation according to an embodiment of the present invention.
Figure 6B:
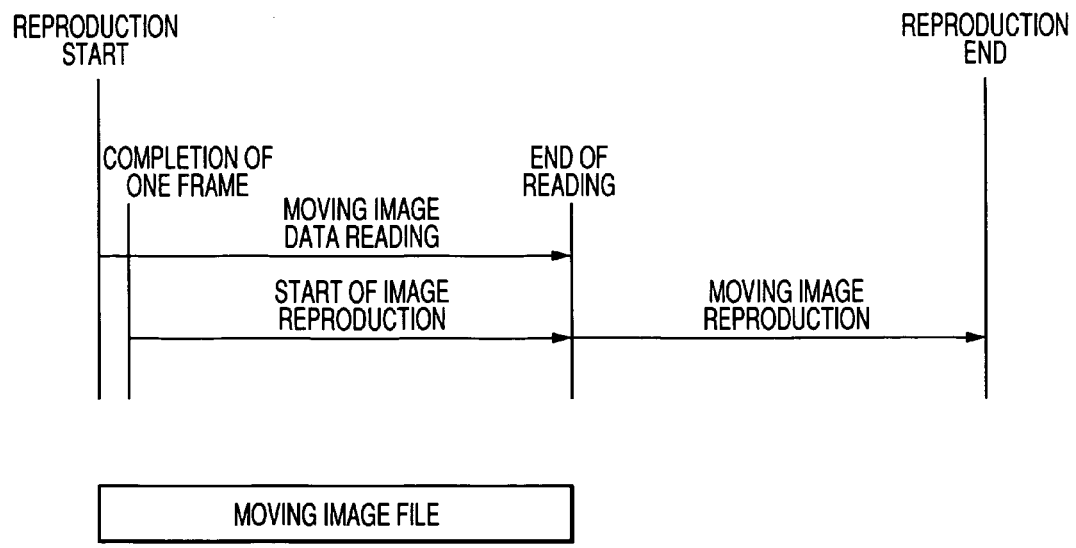

FIG. 6A is a diagram showing the state of the image memory 104 according to the second embodiment, and FIG. 6B is a diagram showing an operation image.

Similar to the above-described embodiment, the system controller 109 reads out the entirety of the designated moving image data file from the memory card M via the interface 108, and temporarily stores it in the encoded data area of the image memory 104.

In this embodiment, when encoded image data of one frame is written in the image memory 104, the system controller 109 reads out the encoded image data of this one frame from the image memory 104 and outputs it to the image processing portion 107. The image processing portion 107 decodes the encoded image data of this one frame and writes it in the standard image area of the image memory 104.

The system controller 109 reads out the decoded image data of one frame from the standard image area of the image memory 104, and sends it to the display 106 to be displayed thereon.

During this period, while the moving image data file is read out from the memory card M, only the image of one frame continues to be displayed on the display. Thereafter, after all the data in the moving image file is written in the image memory 104, the moving image data is sequentially read out from the image memory 104 and decoded to perform moving image reproduction similar to the above-described embodiment.

In this embodiment, even if the data read speed of the memory card M is slow, after encoded image data of one frame is read out, this image data of one frame is decoded and displayed until all the data in the moving image file is completely read out. It is therefore possible to confirm the first frame of the moving image data immediately before all the data is read out.

FIG. 6B is a diagram illustrating this reproduction operation. As shown in FIG. 6B, after the completion of reading one frame, the start image is displayed, and after the completion of reading all frames, the decoding process of the moving image file starts.

Next, a third embodiment of the invention will be described.

Also in this embodiment, description will be made on moving image data reproduction when a data read speed of the memory card M is slower than the data rate of moving image data. Other processes are similar to those of the above-described embodiments.

In the second embodiment, if the data read speed of the memory card is slow, only the first frame of moving image data is decoded and displayed in advance, and during this period all data in one moving image file is stored in the image memory to start reproduction. However, in the third embodiment, after a predetermined amount of moving image data is reproduced from the memory card M and stored in the image memory 104, without waiting for reading out all data in one moving image file from the memory card, a read and storage process form the memory card M to image memory 104 and a read and decode process from the image memory 104 to image processing portion 107 are executed in parallel. When a frame recorded by the image processing portion 107 becomes in time with a frame of moving image data being read from the memory card M, the decoding process is temporarily stopped by stopping reading out moving image data from the image memory 104 to image processing portion 107.

When a predetermined amount of moving image data is stored in the image memory 104 after the decoding process is temporarily stopped, reading out the moving image data to the image processing portion 107 is started again to resume the decoding and reproducing process.

Figure 7A:
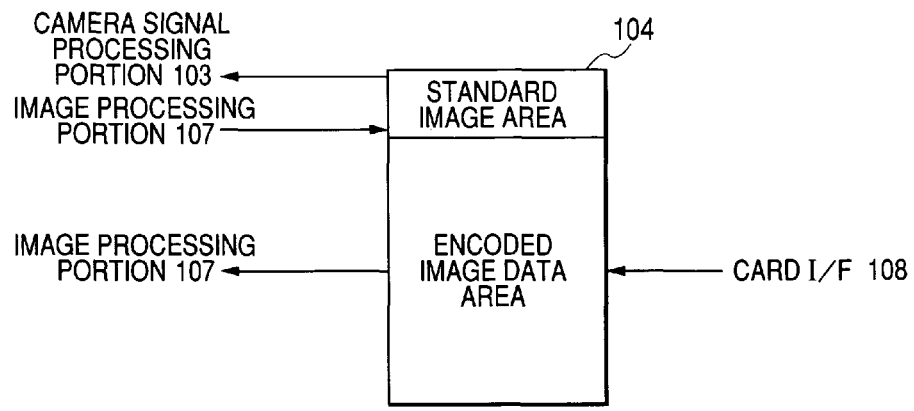
FIGS. 7A and 7B are diagrams illustrating a reproducing operation according to an embodiment of the present invention.
Figure 7B:
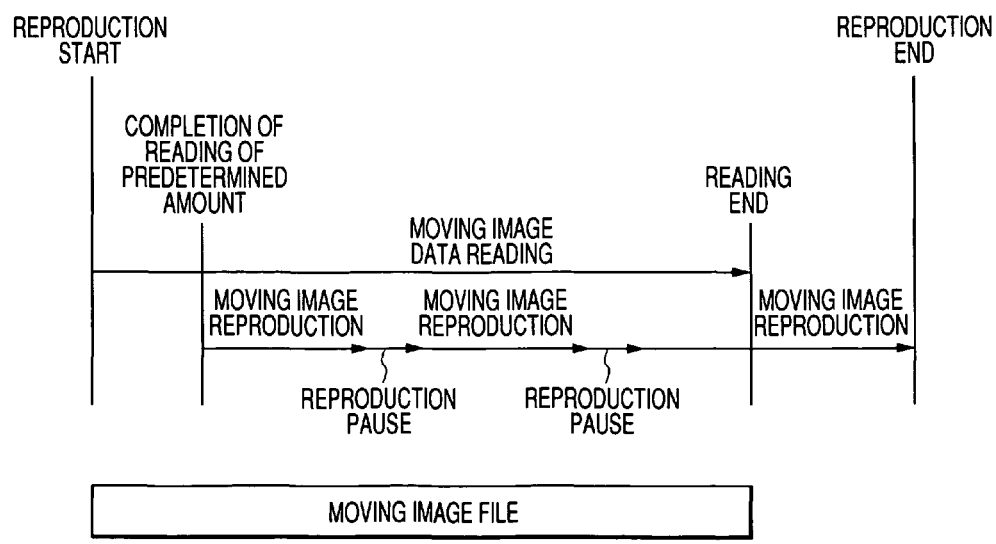

FIGS. 7A and 7B are diagrams illustrating these processes. As shown in FIGS. 7A and 7B, when one frame is completely read, the moving image reproduction starts, when reading the moving image file becomes not in time, reproduction is paused, and when a predetermined amount of moving image data is completely read, the reproduction is resumed. These operations are repeated.

Next, a fourth embodiment will be described.

Also in this embodiment, description will be made on moving image data reproduction when a data read speed of the memory card M is slower than a data transfer rate threshold value necessary for real time moving image reproduction. Other processes are similar to those of the above-described embodiments.

In this embodiment, when a moving image is photographed, voice data picked up from a microphone unit (not shown) is encoded and stored in the memory card M together with the moving image data. Although the memory card M does not have a data read speed capable of reproducing moving image data in real time, it has a data read speed capable of reproducing only voice data in real time.

In this embodiment, upon reception of a moving image reproduction instruction, similar to the second and third embodiments, moving image data is read out from the memory card M and written into the image memory 104. A first frame is read out from the image memory 104 and sent to the image processing portion 107 whereat it is decoded to be displayed.

In this embodiment, while only the voice data contained in the moving image file is read out and decoded in advance, moving image data is read out and stored in the image memory 104.

When all frames in the moving image file are completely read out, reproducing the voice data is stopped, and both the image data and voice data are reproduced from the start image. As described above, only the start image and voice data can be reproduced before all the images are read.

Figure 8A:
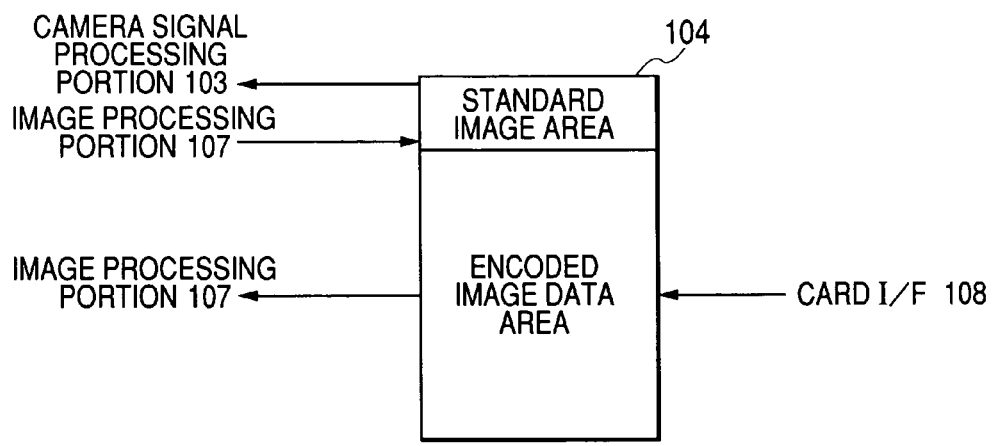
FIGS. 8A and 8B are diagrams illustrating a reproducing operation according to an embodiment of the present invention.
Figure 8B:
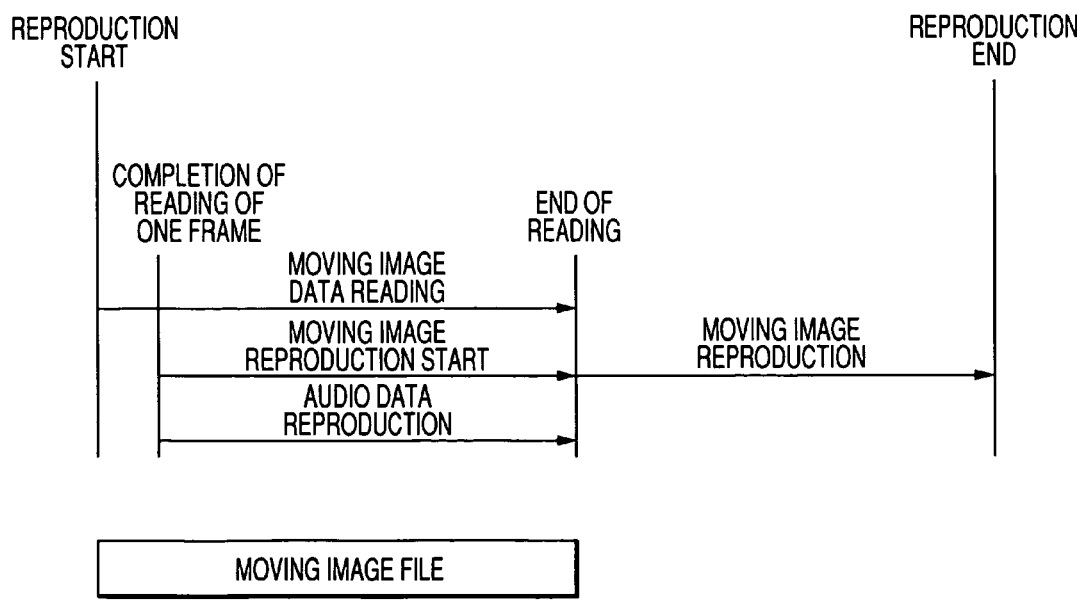

FIGS. 8A and 8B are diagrams illustrating these processes. As shown in FIGS. 8A and 8B, when one frame is read out completely, the corresponding image is reproduced and at the same time only voices start being reproduced. When the moving image data is completely read out, a reproducing operation starts for the moving image data.

In the above-described first embodiment, the data write speed of a memory card is compared with the data rate of moving image data, and if the data write speed is faster than the data rate of moving image data, writing the moving image data into the memory card starts without waiting for the completion of storage of the moving image data into the memory 104. However, a predetermined rate set in association with the data rate of moving image data may be compared with the data write speed of a memory card, if a difference from a settable data rate of moving image data is not so large or if the data rate of moving image data can not be altered. Note that the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, a Blu-ray DISC, and a DVD (a DVD-ROM, a DVD-R, a DVD-RW and a DVD-RAM).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

What is claimed is:

1. A recording apparatus comprising:
producing means for producing moving image data;
writing means, including a memory for storing said moving image data, for writing said moving image data in an external storage device;
speed detecting means for detecting a data write speed of said external storage device; and
control means for controlling an operation of said writing means,
wherein in accordance with the data write speed detected by said speed detecting means, said control means switches a writing mode between (i) a first mode in which said control means suspends reading out said moving image data from said memory until a predetermined amount of said moving image data related to a storage capacity of said memory, and starts reading said moving image data from said memory to write said read moving image data into said external storage device, after storage of said predetermined amount of said moving image data into said memory is completed, and (ii) a second mode in which said control means starts reading said moving image data from said memory without waiting for storage of said predetermined amount of said moving image data into said memory to write said read moving image data into said external storage device, and
wherein said speed detecting means writes a predetermined amount of data into said external storage device and detects the data write speed in accordance with a time taken to write the predetermined amount of data.

2. An apparatus according to claim 1, wherein said speed detecting means detects the data write speed in response to loading said external storage device.

3. An apparatus according to claim 1, wherein said control means selects said first mode if the data write speed is slower than a predetermined speed, and selects said second mode if the data write speed is equal to or faster than the predetermined speed.

4. An apparatus according to claim 1, wherein in said second mode, each time the predetermined amount of said moving image data relating to the storage capacity of said memory is stored in said memory, said control means controls said writing means to read out the predetermined amount of said moving image data from said memory to write said read moving image data into said external storage device.

5. A recording apparatus comprising:
producing means for producing moving image data;
writing means, including a memory for storing said moving image data, for writing said moving image data in an external storage device;

speed detecting means for detecting a data write speed of said external storage device;

control means for controlling an operation of said writing means; and setting means for optionally setting a data rate of said moving image data to be produced by said producing means, wherein said producing means produces said moving image data in accordance with the data rate set by said setting means, wherein in accordance with the data write speed detected by said speed detecting means, said control means switches a writing mode between (i) a first mode in which said control means suspends reading out said moving image data from said memory until a predetermined amount of said moving image data related to a storage capacity of said memory, and starts reading said moving image data from said memory to write said read moving image data into said external storage device, after storage of said predetermined amount of said moving image data into said memory is completed, and (ii) a second mode in which said control means starts reading said moving image data from said memory without waiting for storage of said predetermined amount of said moving image data into said memory to write said read moving image data into said external storage device, and wherein said control means compares the set data rate with the detected data write speed to switch between said first mode and said second mode in accordance with a comparison result.

6. An apparatus according to claim 5, wherein said control means selects said first mode if the data write speed is slower than the set data rate, and selects said second mode if the data write speed is equal to or faster than the set data rate.

7. An apparatus according to claim 5, wherein said producing means includes an input unit for inputting said moving image data and an encoding unit for encoding said moving image data input from said input unit to compress an information amount of said moving image data, and changes a compression factor of said encoding unit for said moving image data in accordance with the set data rate.

8. An apparatus according to claim 5, wherein said producing means includes an image pickup unit for outputting said moving image data, and an image processing unit for changing the number of pixels per frame of said moving image data output from said image pickup unit, in accordance with the data rate set by said setting means.

9. A reproducing apparatus comprising:

reproducing means for reading moving image data from an external storage device;

a memory for storing said moving image data read out by said reproducing means;

decoding means for decoding said moving image data read out from said external storage device;

speed detecting means for detecting a data readable speed of said external storage device; and control means for controlling a reproduction operation of said reproducing means, wherein in accordance with the data readable speed detected by said speed detecting means, said control means switches a reproducing mode between (i) a first mode in which said control means suspends reading said moving image data from said memory until all of said moving image data recorded in one file are read out from said external storage device and stored in said memory, and starts reading said moving image data from said memory to output said read moving image data to said decoding means, after storage of all of said moving image data recorded in one file in said memory is completed, and (ii) a second mode in which said control means starts reading out said moving image data from said memory and starting a decoding process by said decoding means, without waiting for storage of all of said moving image data recorded in one file in said memory.

10. An apparatus according to claim 9, wherein said speed detecting means reads out a predetermined amount of data from said external storage device and detects the data read speed in accordance with a time taken to read out the predetermined amount of data.

11. An apparatus according to claim 9, wherein said speed detecting means detects the data read speed in response to loading said external storage device.

12. An apparatus according to claim 9, wherein said control means selects said first mode if the data read speed is slower than a predetermined speed, and selects said second mode if the data write speed is faster than the predetermined speed.

13. An apparatus according to claim 9, wherein in said second mode, each time a predetermined amount of said moving image data is read out from said external storage device and then stored in said memory, said control means controls said reproducing means to read out the predetermined amount of said moving image data from said memory.

14. An apparatus according to claim 9, wherein said control means detects a data rate of said moving image data, compares the data rate of said moving image data with the detected data readable speed, and switches between said first mode and said second mode in accordance with a comparison result.

15. An apparatus according to claim 14, wherein said control means selects said first mode if the data readable speed is slower than the data rate of said moving image data, and selects said second mode if the data readable speed is equal to or faster than the data rate of said moving image data.

16. A reproducing apparatus comprising:

reproducing means for reading out moving image data from an external storage device;

a memory for storing said moving image data read out by said reproducing means;

decoding means for decoding said moving image data read out from said external storage device;

speed detecting means for detecting a data readable speed of said external storage device; and control means for controlling a reproduction operation of said reproducing means, wherein in accordance with the data readable speed detected by said speed detecting means, said control means switches a reproduction mode between (i) a first mode in which said control means controls said reproducing means to read out only a start frame of said moving image data recorded in one file from said external storage device to be decoded by said decoding means, thereafter suspends reading out said moving image data from said memory until all of said moving image data in said file are read out from said external storage device and stored in said memory, and starts reading out said moving image data from said memory to output said read moving image data to said decoding means, after storage of all of said moving image data recorded in one file in said memory is completed, and (ii) a second mode in which said control means starts reading out said moving image data from said memory and a decoding process by said decoding means, without waiting for storage of all of said moving image data recorded in one file in said memory.

17. An apparatus according to claim 16, wherein said speed detecting means reads out a predetermined amount of data from said external storage device and detects the data read speed in accordance with a time taken to read out the predetermined amount of data.

18. An apparatus according to claim 16, wherein said speed detecting means detects the data read speed in response to loading said external storage device.

19. An apparatus according to claim 16, wherein said control means selects said first mode if the data read speed is slower than a predetermined speed, and selects said second mode if the data write speed is faster than the predetermined speed.

20. An apparatus according to claim 16, wherein said control means detects a data rate of said moving image data, compares the data rate of said moving image data with the detected data readable speed, and switches between said first mode and said second mode in accordance with a comparison result.

21. A reproducing apparatus comprising:
reproducing means for reading out moving image data from an external storage device;
a memory for storing said moving image data read out by said reproducing means;
decoding means for decoding said moving image data read out from said external storage device;
speed detecting means for detecting a data readable speed of said external storage device; and
control means for controlling a reproduction operation of said reproducing means,
wherein in accordance with the data readable speed detected by said speed detecting means, said control means switches a reproduction mode between (i) a first mode in which said control means controls said reproducing means so as to read out only a start frame of said moving image data recorded in one file from said external storage device to be decoded by said decoding means and voice data stored in said file together with said moving image data from said external storage device to output to said decoding means, thereafter suspends reading out said moving image data from said memory until all of said moving image data in said file are read from said external storage device and stored in said memory, and starts reading said moving image data from said memory to output said read moving image data to said decoding means, after storage of all of said moving image data recorded in one file in said memory is completed, and (ii) a second mode in which said control means starts reading said moving image data from said memory and a decoding process by said decoding means, without waiting for storage of all of said moving image data recorded in one file in said memory.

22. An apparatus according to claim 21, wherein said speed detecting means reads out a predetermined amount of data from said external storage device and detects the data read speed in accordance with a time taken to read out the predetermined amount of data.

23. An apparatus according to claim 21, wherein said speed detecting means detects the data read speed in response to loading said external storage device.

24. An apparatus according to claim 21, wherein said control means selects said first mode if the data read speed is slower than a predetermined speed, and selects said second mode if the data write speed is faster than the predetermined speed.

25. An apparatus according to claim 21, wherein said control means detects a data rate of said moving image data, compares the data rate of said moving image data with the detected data readable speed, and switches between said first mode and said second mode in accordance with a comparison result.

26. A reproducing apparatus comprising:
reproducing means for reading moving image data from an external storage device;
a memory for storing said moving image data read out by said reproducing means;
decoding means for decoding said moving image data read out from said external storage device;
speed detecting means for detecting a data readable speed of said external storage device; and
control means for controlling said decoding means,
wherein in accordance with the data readable speed detected by said speed detecting means, said control means switches a reproducing mode between (i) a first mode in which said control means controls said decoding means to suspend decoding said moving image data until all of said moving image data recorded in one file are read out from said external storage device and stored in said memory, and controls said decoding means to start decoding said moving image data which read out from said memory, after storage of all of said moving image data recorded in one file in said memory is completed, and (ii) a second mode in which said control means controls said decoding means to start decoding said moving image data, without storage of all of said moving image data recorded in one file in said memory.

27. An apparatus according to claim 26, wherein said speed detecting means reads out a predetermined amount of data from said external storage device and detects the data read speed in accordance with a time taken to read out the predetermined amount of data.

28. An apparatus according to claim 26, wherein said speed detecting means detects the data read speed in response to loading said external storage device.

29. An apparatus according to claim 26, wherein said control means selects said first mode if the data read speed is slower than a predetermined speed, and selects said second mode if the data write speed is faster than the predetermined speed.

30. An apparatus according to claim 26, wherein said control means detects a data rate of said moving image data, compares the data rate of said moving image data with the detected data readable speed, and switches between said first mode and said second mode in accordance with a comparison result.

31. An apparatus according to claim 30, wherein said control means selects said first mode if the data readable speed is slower than the data rate of said moving image data, and selects said second mode if the data readable speed is equal to or faster than the data rate of said moving image data.

* * * * *